Nov. 16, 1926.  
J. G. RIEFF  
1,607,306  
MILKING STOOL  
Filed March 17, 1926
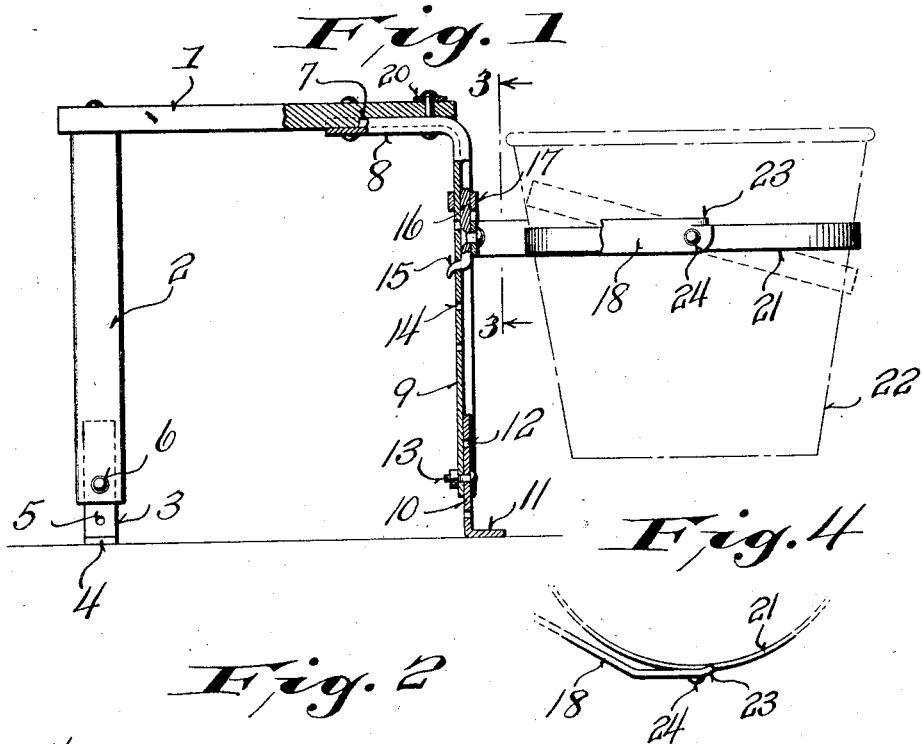
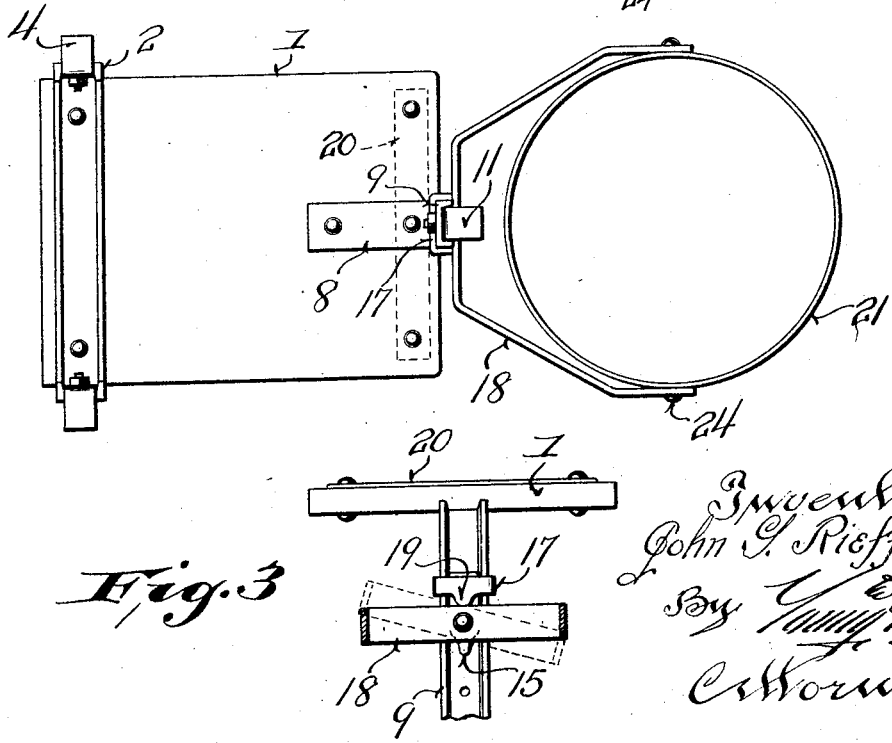

Patented Nov. 16, 1926.

1,607,306

UNITED STATES PATENT OFFICE.

JOHN G. RIEFF, OF LONDON, WISCONSIN.

MILKING STOOL.

Application filed March 17, 1926. Serial No. 95,223.

This invention relates to a milking stool.

Objects of this invention are to provide a combined milking stool and pail holder which is so constructed that the pail holder may be adjusted to its desired position, and which will hold the pail in any suitable angular position.

Further objects are to provide a milking stool and pail holder in which the stool may be adjusted to the desired height independently of the pail adjustment, and in which a very secure construction is attained.

Further objects are to provide a combined milking stool and pail holder in which the pail holder is adapted to swing about an axis at right angles to the stool, and is also adapted to swing about an axis spaced outwardly and approximately parallel to the face of the stool.

An embodiment of the invention is shown in the accompanying drawings, in which:

Figure 1 is a side elevation of the combined stool and pail holder, such view being partly in section.

Figure 2 is a view from the under side of Figure 1.

Figure 3 is a sectional view on the line 3—3 of Figure 1.

Figure 4 is a fragmentary view of a portion of the pail holder looking down upon such pail holder.

Referring to the drawings, it will be seen that the stool comprises a body portion 1 which has a U-shaped channel member 2 attached to its under side and forming a pair of rear legs. These channel members or legs are provided with feet consisting of strap members 3 having outwardly turned lower portions 4. They are provided with a plurality of apertures 5 which may register with apertures in the feet 2, and which receive the attaching bolt 6, thus rendering the feet adjustable. The front of the stool is provided with a pair of slots 7 extending inwardly from its outer edge which receive the flanges of the inwardly turned portion 8 of the channel shaped front leg. The vertical portion 9 of this channel shaped front leg receives the vertical portion 10 of the front foot. This front foot is provided with an outwardly turned portion 11 and with a plurality of apertures 12 which register with an aperture in the front leg and receive the attaching bolt 13, thus providing for the adjustment of the front foot.

The vertical portion 9 of the front leg is also provided with a plurality of spaced apertures 14 which receive the inwardly turned hook or tit 15 of a sliding block 16 mounted between the flanges of the channel shaped front leg. This sliding block has its upper portion locked in place temporarily by means of the collar 17 which loosely surrounds the front leg. This sliding block 16 pivotally carries a yoke 18, and it is to be noted that the sliding collar 17 is provided with a tongue 19 adapted to contact with the yoke 18 as most clearly shown in Figure 3.

In order to further reenforce the stool, it may be found expedient to provide a transverse strap 20 across the front top portion of the stool. The yoke 18 extends outwardly and pivotally carries or supports a ring 21 which temporarily holds the pail 22 as shown in Figure 1. Preferably, the yoke is provided with a pair of inwardly turned tongues 23, (see Figures 1 and 4) which project beyond the pivot points 24 and are adapted to contact with the upper surface of the pail holding ring 21, and prevent rocking of the pail rearwardly beyond its normal position.

It is to be noted, however, that the pail may be adjusted to the desired height by sliding the collar 17 upwardly and tilting the block 16, to thus enter the projecting tit 15 in the appropriate aperture 14. Also, it is to be noted that the pail may be tilted laterally, due to the pivotal joint between the yoke 18 and the block 16. This joint has sufficient friction to retain the pail in its adjusted position. The ring 21 may be rocked about the pivot points 24 and thus adjust the pail outwardly at the desired angle, the tilted position of the ring 21 being shown in Figure 1.

These adjustments facilitate rocking as they permit the pail to be set at the desired angle to accommodate the varying conditions.

Further, it will be noted that when the operator rests his body on the seat 1 of the stool that the parts are very firmly held in place against the floor, and a very rigid and secure support for the pail is provided. However, the pail is free for adjustment, as described, immediately above. It will be seen also that the stool and pail holder are relatively light, although of extremely rigid and substantial construction.

Although the invention has been described in considerable detail, such description is intended as illustrative rather than limiting as the invention may be variously embodied and as the scope of such invention is to be determined as claimed.

I claim:

A combined stool and milk pail holder comprising a body portion, a U-shaped channel member secured to the rear of said body portion and forming a pair of rear legs, feet adjustably mounted within the channel of said rear legs, a front channel member secured to said body portion and forming a front leg, an adjustable foot positioned within the channel of said front leg, a block slidably mounted within the channel of said front leg and having a rearwardly projecting hook, said front leg having a plurality of apertures adapted to receive said hook, a sliding collar carried by said front leg and adapted to engage over the upper end of said sliding block, a yoke pivoted to said sliding block, and a pail receiving ring pivotally carried by said yoke.

In testimony that I claim the foregoing I have hereunto set my hand at London, in the county of Dane and State of Wisconsin.

JOHN G. RIEFF.